(12) United States Patent
Uemori et al.

(10) Patent No.: US 8,929,670 B2
(45) Date of Patent: Jan. 6, 2015

(54) IMAGE PROCESSING METHOD AND IMAGE PROCESSING APPARATUS

(75) Inventors: Takeshi Uemori, Tokyo (JP); Ohji Nakagami, Tokyo (JP); Takuya Kitamura, Tokyo (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/958,950

(22) Filed: Dec. 2, 2010

(65) Prior Publication Data

US 2011/0142356 A1     Jun. 16, 2011

(30) Foreign Application Priority Data

Dec. 10, 2009    (JP) ................................ 2009-281059

(51) Int. Cl.
    *G06K 9/36*            (2006.01)
    *G06K 9/46*            (2006.01)
    (Continued)

(52) U.S. Cl.
    CPC ........ *H04N 19/00757* (2013.01); *G02B 21/367* (2013.01); *G06K 9/00134* (2013.01); *G06K 9/36* (2013.01); *H04N 19/0089* (2013.01); *H04N 19/0026* (2013.01); *H04N 19/00903* (2013.01); *H04N 19/00763* (2013.01); *H04N 19/00436* (2013.01)
    USPC ............................ 382/236; 382/264; 382/299

(58) Field of Classification Search
    USPC .......................... 382/232, 236, 264, 298, 299
    See application file for complete search history.

(56) References Cited

U.S. PATENT DOCUMENTS

| | | | |
|---|---|---|---|
| 5,126,962 | A | 6/1992 | Chiang |
| 5,289,289 | A | 2/1994 | Nagasaki |

(Continued)

FOREIGN PATENT DOCUMENTS

| | | |
|---|---|---|
| JP | 63-292769 A | 11/1988 |
| JP | 03-080676 A | 4/1991 |

(Continued)

OTHER PUBLICATIONS

Irani, Michal et al., "Improving Resolution by Image Registration", Department of Computer Science, The Hebrew University of Jerusalem, CVGIP: Graphical Models and Image Processing, vol. 53, No. 3, May 1991, pp. 231-239.

(Continued)

*Primary Examiner* — Bernard Krasnic
(74) *Attorney, Agent, or Firm* — Wolf, Greenfield & Sacks, P.C.

(57) ABSTRACT

Provided is an image processing apparatus including: a prediction portion to perform an inter-magnification-ratio blur-compensation prediction with respect to a reduced-size reference focus face image, to thereby generate an inter-magnification-ratio blur-compensation predicted image at each of a plurality of focus positions, the reduced-size reference focus face image being obtained by reducing a size of a reference focus face image to be a reference of a plurality of focus face images obtained by imaging a subject at the plurality of focus positions; a differential data generation portion to generate, for each of the plurality of focus positions, differential data between the focus face image and the inter-magnification-ratio blur-compensation predicted image generated by the prediction portion; and an encoding portion to encode the reduced-size reference focus face image and the differential data generated by the differential data generation portion.

16 Claims, 9 Drawing Sheets

(51) Int. Cl.
*G06K 9/40* (2006.01)
*G06K 9/32* (2006.01)
*H04N 19/59* (2014.01)
*G02B 21/36* (2006.01)
*G06K 9/00* (2006.01)
*H04N 19/80* (2014.01)
*H04N 19/17* (2014.01)
*H04N 19/85* (2014.01)
*H04N 19/593* (2014.01)
*H04N 19/33* (2014.01)

(56) References Cited

U.S. PATENT DOCUMENTS

| | | | |
|---|---|---|---|
| 5,327,242 | A | 7/1994 | Naimpally et al. |
| 5,355,167 | A | 10/1994 | Juri |
| 5,369,439 | A | 11/1994 | Matsuda et al. |
| 5,442,399 | A | 8/1995 | Asamura et al. |
| 5,485,533 | A | 1/1996 | Hatano et al. |
| 5,933,193 | A | 8/1999 | Niesen |
| 5,959,672 | A | 9/1999 | Sasaki |
| 6,185,312 | B1 | 2/2001 | Nakamura et al. |
| 6,633,676 | B1 | 10/2003 | Kleihorst et al. |
| 8,310,531 | B2 | 11/2012 | Nandy |
| 2005/0100245 | A1* | 5/2005 | Chen et al. .......... 382/294 |
| 2006/0062308 | A1 | 3/2006 | Staelin et al. |
| 2007/0098068 | A1 | 5/2007 | Kimata et al. |
| 2007/0291847 | A1 | 12/2007 | Shimauchi et al. |
| 2008/0069469 | A1* | 3/2008 | Yan et al. .......... 382/261 |
| 2008/0165848 | A1* | 7/2008 | Ye et al. .......... 375/240.13 |
| 2008/0260043 | A1 | 10/2008 | Bottreau et al. |
| 2009/0010568 | A1 | 1/2009 | Nakagami et al. |
| 2009/0074061 | A1 | 3/2009 | Yin et al. |
| 2009/0080535 | A1 | 3/2009 | Yin et al. |
| 2009/0116760 | A1 | 5/2009 | Boon et al. |
| 2009/0252425 | A1* | 10/2009 | Bruls et al. .......... 382/232 |
| 2009/0262803 | A1 | 10/2009 | Wang et al. |
| 2010/0118963 | A1 | 5/2010 | Nakagami et al. |
| 2010/0183072 | A1 | 7/2010 | Nakagami et al. |
| 2011/0085741 | A1* | 4/2011 | Zhang et al. .......... 382/255 |
| 2011/0150354 | A1* | 6/2011 | Huang .......... 382/260 |
| 2011/0175993 | A1 | 7/2011 | Uemori et al. |
| 2012/0057777 | A1 | 3/2012 | Uemori et al. |
| 2012/0251014 | A1 | 10/2012 | Watanabe et al. |
| 2013/0120550 | A1 | 5/2013 | Chen et al. |
| 2013/0242219 | A1 | 9/2013 | Yun et al. |

FOREIGN PATENT DOCUMENTS

| | | | | |
|---|---|---|---|---|
| JP | 03-217183 | A | 9/1991 | |
| JP | 08-266481 | A | 10/1996 | |
| JP | 09284760 | A | * 10/1997 | ............... H04N 7/24 |
| JP | 10-261965 | A | 9/1998 | |
| JP | 11-046361 | A | 2/1999 | |
| JP | 2000-316120 | A | 11/2000 | |
| JP | 2002-135721 | A | 5/2002 | |
| JP | 2004-007707 | A | 1/2004 | |
| JP | 2004-118525 | A | 4/2004 | |
| JP | 2005-533320 | A | 11/2005 | |
| JP | 2006-197074 | A | 7/2006 | |
| JP | 2007-011977 | | 1/2007 | |
| JP | 2008-124641 | A | 5/2008 | |
| JP | 2008-533554 | A | 8/2008 | |
| JP | 2010-172001 | A | 8/2010 | |

OTHER PUBLICATIONS

Baskurt et al., 3-Dimensional Image Compression by Discrete Cosine Transform. Signal Processing, Theories and Applications. Proceed Euro Signal Process Conf (EUSIPCO), Sep. 5-8, 1988;1:79-82.

Chan et al., Three-dimensional transform compression of images from dynamic studies. Proceed SPIE, SPIE, 1990;1232:322-6.

Chan et al., 3D-DCT Quantization as a Compression Technique for Video Sequences. IEEE, International Conference Sep. 1997, pp. 188-196, The Chinese University of Hong Kong, Hong Kong.

Maor et al., MPEG-2→H.264 Transcoding. Dec. 1, 2004, Technion—Israel Institute of Technology, SIPL H.264 Workshop.

Ramaswamy et al., A Mixed Transform Approach for Efficient Compression of Medical Images. IEEE Trans. Medic. Imaging, 1996;15(3): 343-352.

Roese et al., Interframe Cosine Transform Image Coding. IEEE Transac Commun, 1977;25(11):1329-39.

Urbano et al., 3-Dimensional medical image compression: A first approach to the application of the ADCT-ISO. Engineering in Medic. and Biol. Soc., Proceed. Ann. Intl. Conf. of IEEE, 1992;1219-20.

* cited by examiner

IMAGE PROCESSING METHOD AND IMAGE PROCESSING APPARATUS

BACKGROUND OF THE INVENTION

1. Field of the Invention

The present invention relates to an image processing method and an image processing apparatus, which are capable of performing a compression coding and a decoding with respect to image data.

2. Description of the Related Art

A virtual microscope system includes a microscope apparatus capable of obtaining image data and a computer to process the image data. The virtual microscope system images the entire of a microscope slide on which a specimen is placed and store and display that image as a digital image. In the virtual microscope system, it is hoped that the virtual microscope system will have an operatibility equal to or higher than that of a real microscope.

One of operations hoped is, as in the real microscope, an operation of changing a focus position through rotating a slow-motion focus screw so as to allow an observation with respect to an arbitrary focus surface. The above-mentioned operation is an operation necessary for observing a sample having a certain thickness by using a microscope optical system having a very small depth of field. In particular, in the field of diagnostics, the above-mentioned operation is useful for grasping the form of a cell in three dimensions through observing while changing a focus by an examiner.

In the virtual microscope system, in order to realize the above-mentioned operation, data sets of images (hereinafter, referred to as "focus face images") obtained by imaging a sample at a plurality of focus positions are necessary (see FIG. 1). Therefore, from one sample, a large amount of the image data is obtained. In view of this, in the virtual microscope system, a compression of the image data is performed.

For example, Japanese Patent Application Laid-open No. 2007-11977(hereinafter, referred to as Patent Literature 1) discloses a compression method including using an inter-frame encoding with respect to a plurality of focus face images. In the inter-frame encoding, a difference is determined between frames adjacent to each other. In addition, in Patent Literature 1, there is also described that a focus face to be the reference is defined, and a blur change depending on an optical parameter and a Z coordinate change from the reference focus face is utilized to perform a blur-compensation prediction, so that the compression is performed.

Further, another operation hoped to be realized in the virtual microscope system is a high speed switching of the magnification ratio of an image to be observed. In the real microscope, generally, the entire microscope slide is first viewed through a low magnification lens, and then a level of detail for the observation is gradually increased through switching the current lens to a higher magnification lens to be used one after another. In a typical virtual microscope system, various resolution image data sets obtained by gradually lowering the resolution from the original image data imaged are generated (see FIG. 2) and stored, and a pertinent image data is read and displayed according to an arbitrary resolution and an arbitrary specification of a display range of the image, which are determined by a user.

SUMMARY OF THE INVENTION

However, in the inter-frame encoding process as disclosed in Patent Literature 1, an encoding/decoding process amount, particularly an encoding/decoding process amount for the reference image is enormous. Thus, there is a fear that the efficiency for diagnostics through observing images may be lowered. In addition, a large volume memory for storing the reference images during the encoding/decoding is necessary, which leads to an increase of the cost. Further, as in the above-mentioned typical virtual microscope system, various resolution images are necessary for each focus face, and hence an entire amount of the image data is enormous.

Further, in a case where the inter-frame encoding process of Patent Literature 1 is employed for a compression of the image data being at each resolution, in order to decode a focus face image being at an arbitrary resolution and a focus position, it is necessary to decode a focus face image, which is at the same resolution and is adjacent to the above-mentioned focus face image in the focus direction, before the decoding of this focus face image. Therefore, it takes a long time before the decoding of the arbitrary focus face image, and hence it is not useful.

In addition, a process of performing a prediction encoding between images each being at a resolution different from each other is also conceivable. However, in this case, in order to decode a focus face image being at an arbitrary resolution and an arbitrary focus position, it is necessary to decode a focus face image being at the same resolution as a focus face image, which has been defined as the reference image, in the above-mentioned position before the decoding of this focus face image. Thus, also in this case, there is a problem in that it takes a long time before the decoding of the arbitrary focus face image. As described above, it is desirable to provide an efficient compression process.

In view of the above-mentioned circumstances, there is a need for providing an image processing method and an image processing apparatus, which are capable of encoding, at a high compression rate, various resolution image data sets at respective multiple focus positions.

Further, there is a need for providing an image processing method and an image processing apparatus, which are capable of efficiently encoding various resolution image data sets at respective multiple focus positions.

According to an embodiment of the present invention, there is provided an image processing apparatus including a prediction portion, a differential data generation portion, and an encoding portion. The prediction portion performs an inter-magnification-ratio blur-compensation prediction with respect to a reduced-size reference focus face image, to thereby generate an inter-magnification-ratio blur-compensation predicted image at each of a plurality of focus positions, the reduced-size reference focus face image being obtained by reducing a size of a reference focus face image to be a reference of a plurality of focus face images obtained by imaging a subject at the plurality of focus positions. The differential data generation portion generates, for each of the plurality of focus positions, differential data between the focus face image and the inter-magnification-ratio blur-compensation predicted image generated by the prediction portion. The encoding portion encodes the reduced-size reference focus face image and the differential data generated by the differential data generation portion.

In the above-mentioned embodiment of the present invention, it is possible to obtain, as the result of compression encoding, the reduced-size reference focus face image and the differential data at each focus position. Thus, as compared with a generally employed compression process of compressing a focus face image at each focus position, the compression rate is increased. In addition, the size-reduced image is used as the reference image, and hence the consumed amount of the memory and the entire process amount can be further decreased.

The prediction portion may perform the inter-magnification-ratio blur-compensation prediction through a magnification filter and a blur compensation filter.

The prediction portion may perform the inter-magnification-ratio blur-compensation prediction based on a plurality of reference focus face images. With this, it is possible to increase the accuracy of the inter-magnification-ratio blur-compensation prediction, and hence it is possible to enhance the compression efficiency. Further, it is possible to perform the prediction with a high accuracy even in a case where a plurality of focused focus faces are found.

The image processing apparatus may further include a size-reduction portion to reduce the size of the reference focus face image, to thereby generate the reduced-size reference focus face image.

The focus face image may be an image obtained by stereo-imaging a subject at a plurality of focus positions.

According to another embodiment of the present invention, there is provided an image processing method including: performing an inter-magnification-ratio blur-compensation prediction with respect to a reduced-size reference focus face image, to thereby generate an inter-magnification-ratio blur-compensation predicted image at each of a plurality of focus positions, the reduced-size reference focus face image being obtained by reducing a size of a reference focus face image to be a reference of a plurality of focus face images obtained by imaging a subject at the plurality of focus positions; generating, for each of the plurality of focus positions, differential data between the generated inter-magnification-ratio blur-compensation predicted image and the focus face image; and encoding the reduced-size reference focus face image and the generated differential data.

In the above-mentioned embodiment of the present invention, it is possible to obtain, as the result of compression encoding, the reduced-size reference focus face image and the differential data at each focus position. Thus, as compared with a generally employed compression process of compressing a focus face image at each focus position, the compression rate is increased. In addition, the size-reduced image is used as the reference image, and hence the consumed amount of the memory and the entire process amount can be further decreased.

According to still another embodiment of the present invention, there is provided an image processing apparatus including a decoding portion, a prediction portion, and a restoring portion. The decoding portion decodes encoded data obtained by encoding a reduced-size reference focus face image and differential data, the reduced-size reference focus face image being obtained by reducing a size of a reference focus face image to be a reference of a plurality of focus face images obtained by imaging a subject at the plurality of focus positions, the differential data being obtained by determining a difference, for each of the plurality of focus positions, between the focus face image and an inter-magnification-ratio blur-compensation predicted image obtained by performing an inter-magnification-ratio blur-compensation prediction with respect to the reduced-size reference focus face image. The prediction portion performs an inter-magnification-ratio blur-compensation prediction with respect to the reduced-size reference focus face image decoded by the decoding portion, to thereby generate an inter-magnification-ratio blur-compensation predicted image at each of the plurality of focus positions. The restoring portion combines the inter-magnification-ratio blur-compensation predicted image generated by the prediction portion with the differential data generated by the decoding portion, to thereby restore the focus face image at each of the plurality of focus positions.

It is sufficient to perform only one decoding of the reference image necessary for the restoration of the focus face image at each focus position. Therefore, a process amount during the decoding is decreased. Thus, the process can be performed at a higher speed and a consumed amount of the memory can be decreased.

According to still another embodiment of the present invention, there is provided an image processing method including: decoding encoded data obtained by encoding a reduced-size reference focus face image and differential data, the reduced-size reference focus face image being obtained by reducing a size of a reference focus face image to be a reference of a plurality of focus face images obtained by imaging a subject at the plurality of focus positions, the differential data being obtained by determining a difference, for each of the plurality of focus positions, between the focus face image and an inter-magnification-ratio blur-compensation predicted image obtained by performing an inter-magnification-ratio blur-compensation prediction with respect to the reduced-size reference focus face image; performing an inter-magnification-ratio blur-compensation prediction with respect to the decoded reduced-size reference focus face image, to thereby generate an inter-magnification-ratio blur-compensation predicted image at each of the plurality of focus positions; and combining the generated inter-magnification-ratio blur-compensation predicted image with the decoded differential data, to thereby restore the focus face image at each of the plurality of focus positions.

It is sufficient to perform only one decoding of the reference image necessary for the restoration of the focus face image at each focus position. Therefore, a process amount during the decoding is decreased. Thus, the process can be performed at a higher speed and a consumed amount of the memory can be decreased.

According the embodiments of the present invention, the various resolution image data sets at the respective multiple focus positions can be encoded at a high compression rate. Further, the various resolution image data sets at the respective multiple focus positions can be efficiently encoded.

DESCRIPTION OF PREFERRED EMBODIMENTS

Hereinafter, embodiments of the present invention will be described with reference to the drawings.

Figure 1:
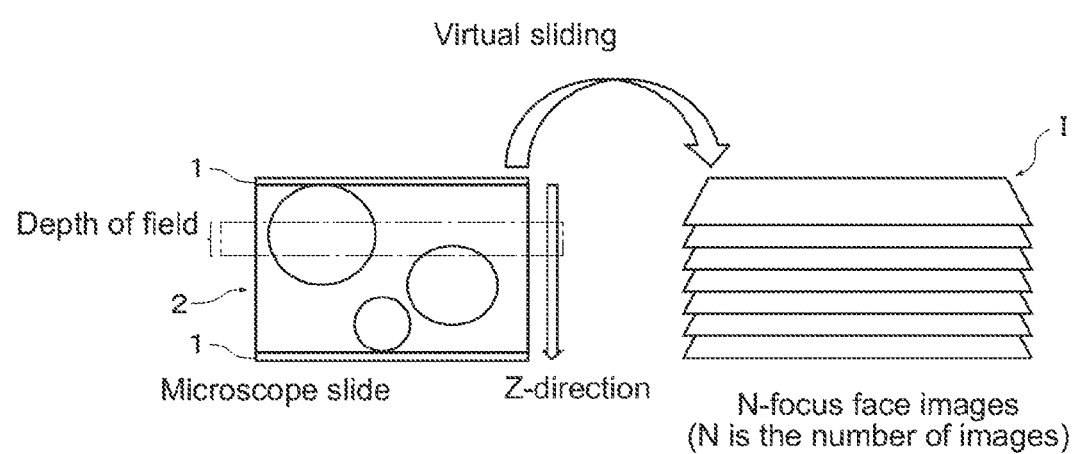
FIG. 1 is an explanatory diagram for focus face images.

<First Embodiment>
[1]. Image Data
First, the description will be made of image data.
FIG. 1 is an explanatory diagram for focus face images.

An image pick-up means provided to a microscope (not shown) images, for example, a predetermined-resolution sample (subject) 2 in the following manner, the sample 2 being held between two microscope slides 1 and 1. Specifically, the image pick-up means performs the imaging each time when a focus position of an optical system is displaced to the Z-axis direction of FIG. 1 by a predetermined distance, for example. Images I having respective depths of field are referred to as "focus face images I." The above-mentioned process is referred to as a "virtual sliding."

Figure 2:
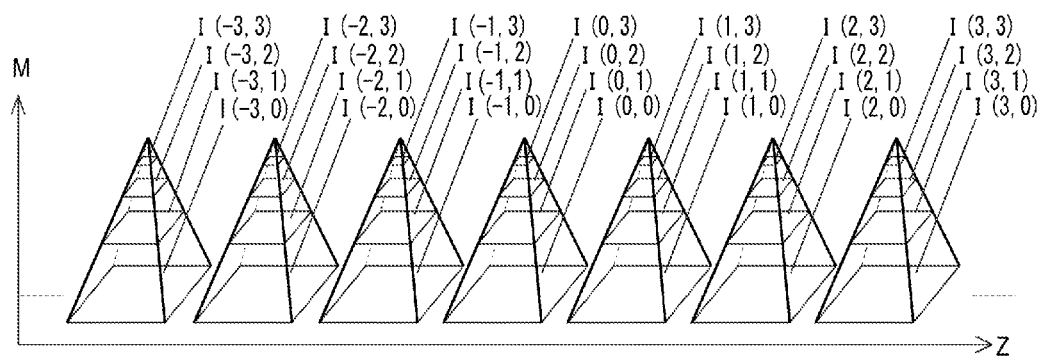
FIG. 2 is an explanatory diagram for pyramid structures of the focus face images.

FIG. 2 is an explanatory diagram for pyramid structures of the focus face images picked up in the above-mentioned method. In FIG. 2, the horizontal axis is a focus direction axis (hereinafter, referred to as "Z-axis"), and the vertical axis is a magnification ratio (resolution) direction axis (hereinafter, referred to as "M-axis"). In FIG. 2, I(z, m) represents an image defined by z in the Z-axis direction and m in the M-axis direction. Generally, each focus face image I(z, m) generates pieces of image data I(z, 1), I(z, 2) and I(z, 3) each being at various resolutions, which are obtained by gradually lowering the resolution of imaged image data I(z, 0) being at the largest resolution. Each focus face image I(z, m) has a pyramid structure obtained by configuring the above-mentioned image data so as to have a layered form.

Figure 3:
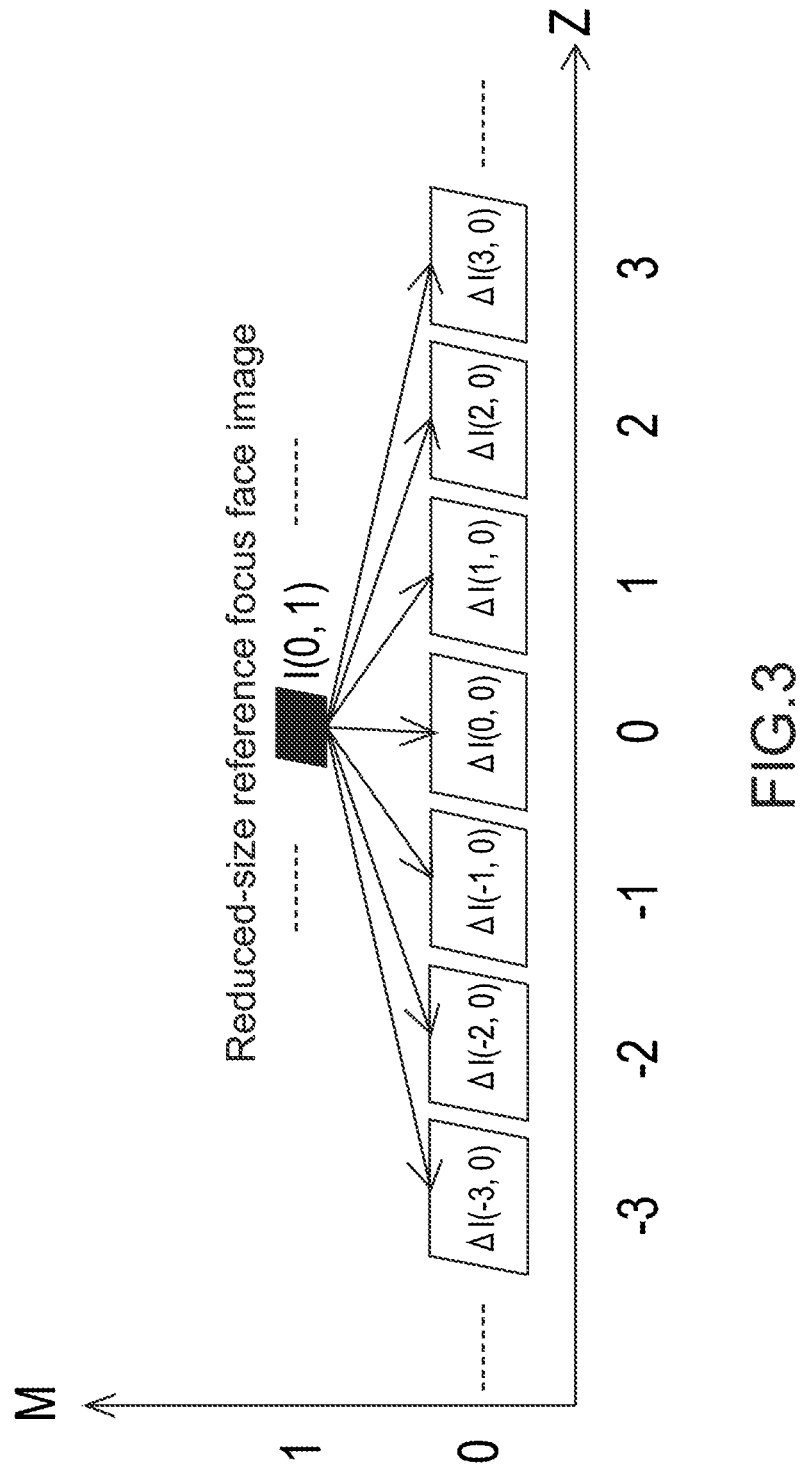
FIG. 3 is an explanatory diagram for an encoding process according to a first embodiment of the present invention.

[2. Encoding Process According to First Embodiment]
FIG. 3 is an explanatory diagram for the outline of an encoding process according to the first embodiment of the present invention. In FIG. 3, the horizontal axis is a Z-axis, and the vertical axis is an M-axis. Here, for the sake of description, each focus face image I(z, m) is configured in two layers. A lower layer is set to a focus face image I(z, 0) being at a higher magnification, and an upper layer is set to a focus face image I(z, 1) being at a lower magnification.

The focus face image I(z, 0) being at a higher magnification ratio is an actually imaged image. In this case, the focus face image I(z, 0) is an image being at a very high resolution, for example, 60480×40320 [pixel]. Several dozen focus face images I (z, 0) each being at a higher magnification ratio are imaged. The focus face image I(z, 1) being at a lower magnification ratio is obtained by selecting one focus face image according to a predetermined reference among the above-mentioned focus face images I(z, 0) each being at a higher magnification, and then reducing the size of the selected focus face image through a well-known filter such as Lanczos. A reduction ratio of an image being at an arbitrary m is represented as follows.

Reduction ratio: Mag=2
Reduced size of image being at arbitrary m: $(1/Mag)^M$

The reduction ratio is desirably 1/2 in view of both of a prediction accuracy and a calculation by a computer. However, as the reduction ratio, 1/4, 1/8, or less may be selected.

A plurality of focus face images each being at the same magnification ratio in this focus face image group has a certain correlation with respect to each other because the plurality of focus face images are images imaged at the same observation point. For example, provided that one focused focus face exists (focused focus face is one plane), a blur change is modeled by using a point-spread function expressed by Expression 3 while the above-mentioned focus face is defined as the reference. Further, a predetermined correlation is also established between focus face images being at various magnification ratios. The focus face image I (z, 0) being at a higher magnification ratio and an image, which is obtained by magnifying the focus face image I(z, 1) being at a lower magnification ratio through a well-known filter such as Lanczos expressed by Expression 1, have a correlation with respect to each other. An encoding process of the first embodiment is one that realizes a data compression at a high compression rate by utilizing the correlation between the above-mentioned focus face images and the correlation between the above-mentioned focus face images being at various magnification ratios.

[3. Details of Encoding Process]
Next, the description will be made of the details of the encoding process of the first embodiment.

In the first embodiment, the encoding process utilizing the correlation between the above-mentioned focus face images and the correlation between the above-mentioned focus face images being at various magnification ratios is performed by a CPU 101 according to a program loaded into an ROM 102. The ROM 102 is a main memory on a computer 100 having a typical configuration shown in FIG. 9.

The program operates the computer 100 as a size reduction portion, a first inter-magnification-ratio blur-compensation prediction portion, a differential data generation portion, and an output portion. The size reduction portion is a module to reduce the size of at least one of a plurality of focus face images obtained by imaging the subject at a plurality of focus positions, the at least one being as a reference focus face image. The first inter-magnification-ratio blur-compensation prediction portion is a module to generate inter-magnification-ratio blur-compensation predicted images for the focus face images at the plurality of focus positions by an inter-magnification-ratio blur-compensation prediction performed based on the reduced-size reference focus face image. In this case, each of the inter-magnification-ratio blur-compensation predicted images is being at a higher magnification ratio than that of the reference focus face image. The differential data generation portion is a module to generate differential data between the generated inter-magnification-ratio blur-compensation predicted image at each focus position and the focus face image at each focus position. The output portion is a module to output the reduced-size reference focus face image and the differential data at each focus position as the results of the encoding.

Figure 4:
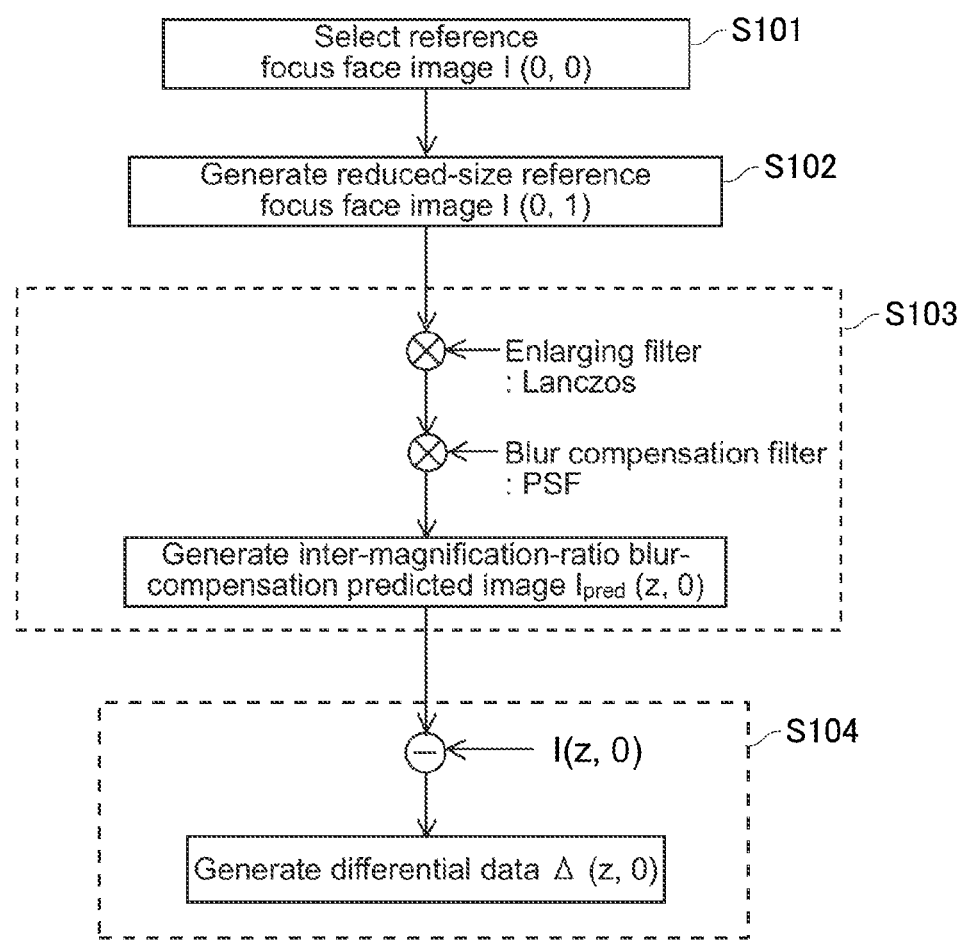
FIG. 4 is a flow chart showing an encoding procedure according to the first embodiment of the present invention.

FIG. 4 is a flow chart showing an encoding procedure.

First, the CPU 101 selects, among the focus face images I(z, 0) each being at a higher magnification ratio, a best-focused focus face image as the reference focus face image (Step S101). Here, the reference focus face image is indicated by I(0, 0). As a method of determining the best-focused focus face image, the following method is exemplified. Specifically, in the method, a contrast intensity in the peripheries of the edges of all focus face images imaged is checked, and a focus face image having the largest contrast intensity among the all focus face images is determined as the reference focus face image. Otherwise, the reference focus face image may be determined by using a well-known focus frame detection technology.

Next, the CPU 101 reduces the size of the reference focus face image I(0, 0) through a well-known filter such as Lanczos, to thereby generate a reduced-size reference focus face image I(0, 1) (Step S102). As the reduction ratio becomes higher in this time, a process mount during the encoding of the reference image and a memory size for storing the encoded reference image can be reduced.

Next, the CPU 101 performs an inter-magnification-ratio blur-compensation prediction performed based on the reduced-size reference focus face image I(0, 1), to thereby generate an inter-magnification-ratio blur-compensation predicted image $I_{pred}(z, 0)$ being at a higher magnification ratio at an arbitrary Z-position (Step S103).

The inter-magnification-ratio blur-compensation prediction is performed in the following manner. Specifically, a well-known magnification filter of various types and a blur compensation filter represented by the point spread function (PSF) are applied to the reduced-size reference focus face image I(0, 1). In this case, the blur compensation filter is applied in view of a blur, which is described in the following.

For example, Lanczos defined by the magnification filter in the following manner may be used.

$$Lanczos(x) = \begin{cases} sinc(x) \cdot sinc\left(\frac{x}{n}\right) & |x| \leq n \\ 0 & |x| > n \end{cases}$$ [Expression 1]

$$sinc(x) = \sin(\pi x)/\pi x$$

Where n represents a positive integer, and generally, n=2 or n=3 is established.

The blur compensation filter is represented by the following point spread function (PSF), using an optical parameter of the microscope, which is measured in advance, and an allowed circle of confusion radius R depending on a Z-position displacement based on the reduced-size reference focus face image.

$$R(z) = \alpha \cdot Z\_pitch \cdot |z - z_0| + \beta$$ [Expression 2]

Where Z_pitch represents an imaging interval of approximately several um in the focus direction. Further, $z_0$ represents a Z-position on a reference focus face, and in an example of FIG. 3, $z_0 = 0$ is established. Further, α and β represent coefficients defined by a relation between the optical system and an image pick-up device.

$$PSF(x, y, z) = \frac{1}{\pi R(z)^2} \exp\left[-\frac{(x + x_0)^2 + (y + y_0)^2}{R(z)^2}\right]$$ [Expression 3]

Where π represents a circular constant, (x, y) represents a coordinate of the filter, and (x0, y0) represents a center coordinate of the filter.

Thus, the inter-magnification-ratio blur-compensation predicted image $I_{pred}(z, 0)$ on the arbitrary Z-position focus face is expressed as follows.

$$I_{pred}(z,0) = [I(0,1) \otimes Lanczos(x,y)] \otimes PSF(x,y,z)$$ [Expression 4]

Finally, the CPU 101 determines, as shown in Expression 5, a difference between the inter-magnification-ratio blur-compensation predicted image $I_{pred}(z, 0)$ and the focus face image $I(z, 0)$ to be compressed, to thereby generate differential data $\Delta(z, 0)$ (Step S104).

$$\Delta(z,0) = I(z,0) - I_{pred}(z,0)$$ [Expression 5]

In FIG. 3, pieces of the differential data are shown as white squares, and the image data is represented as a black square.

Further, with respect to the differential data, well known various encoding processes such as a frequency conversion technology and a lossless compression technology are applied. In this manner, further compression at a high degree can be achieved.

Figure 9:
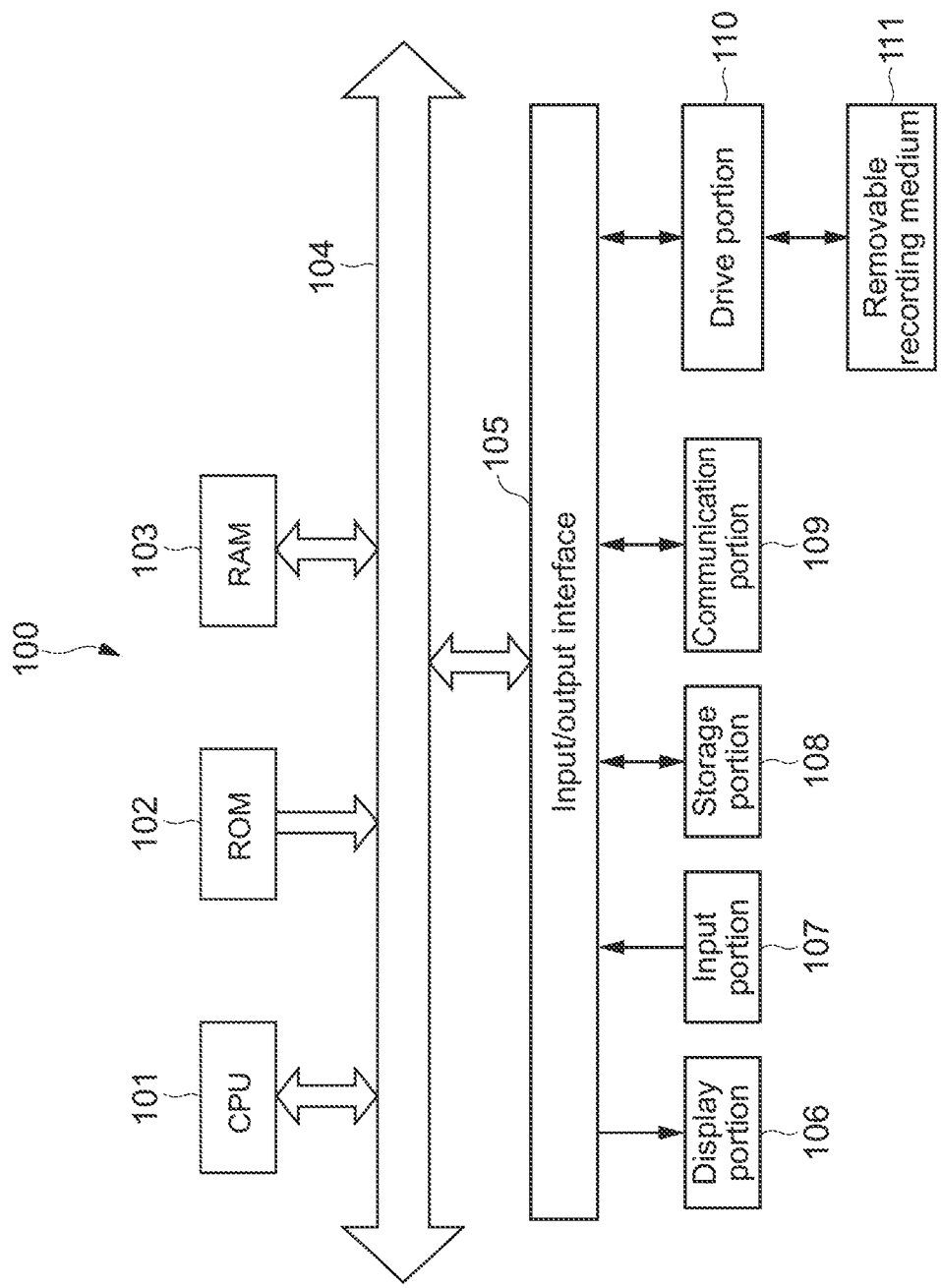
FIG. 9 is a block diagram showing a hardware configuration of an image processing apparatus according to the embodiments of the present invention.

The CPU 101 stores the reduced-size reference focus face image I(0, 1) and the differential data $\Delta(z, 0)$ as a result of the compression encoding of the image in a storage portion 108 (FIG. 9). Further, the CPU 101 outputs the reduced-size reference focus face image I(0, 1) and the differential data $\Delta(z, 0)$, for example, through communicating to the outside through the communication portion 109 (FIG. 9).

[4. Details of Decoding Process]

Next, the description will be made of the details of the decoding process of the first embodiment.

In the first embodiment, the CPU 101 according to the program loaded in the ROM 102 performs the above-mentioned process of decoding the encoded image data, which utilizes the correlation between the focus face images and the correlation between the focus face images being at various magnification ratios. The ROM 102 is a main memory on the computer 100 having the typical configuration shown in FIG. 9.

According to the program, the computer 100 is operated. The computer 100 includes a reference focus face image decoding portion, a second inter-magnification-ratio blur-compensation prediction portion, and a restoring portion. The reference focus face image decoding portion is a module to decode the reduced-size reference focus face image in the results of the encoding. The second inter-magnification-ratio blur-compensation prediction portion is a module to generate inter-magnification-ratio blur-compensation predicted images for the focus face images at the plurality of focus positions by an inter-magnification-ratio blur-compensation prediction performed based on the decoded reference focus face image. In this case, each of the inter-magnification-ratio blur-compensation predicted images is being at a higher magnification ratio than that of the reference focus face image. The restoring portion is a module to restore the focus face image at each focus position by combining the generated inter-magnification-ratio blur-compensation predicted image with the differential data at each focus position in the results of the encoding.

Figure 5:
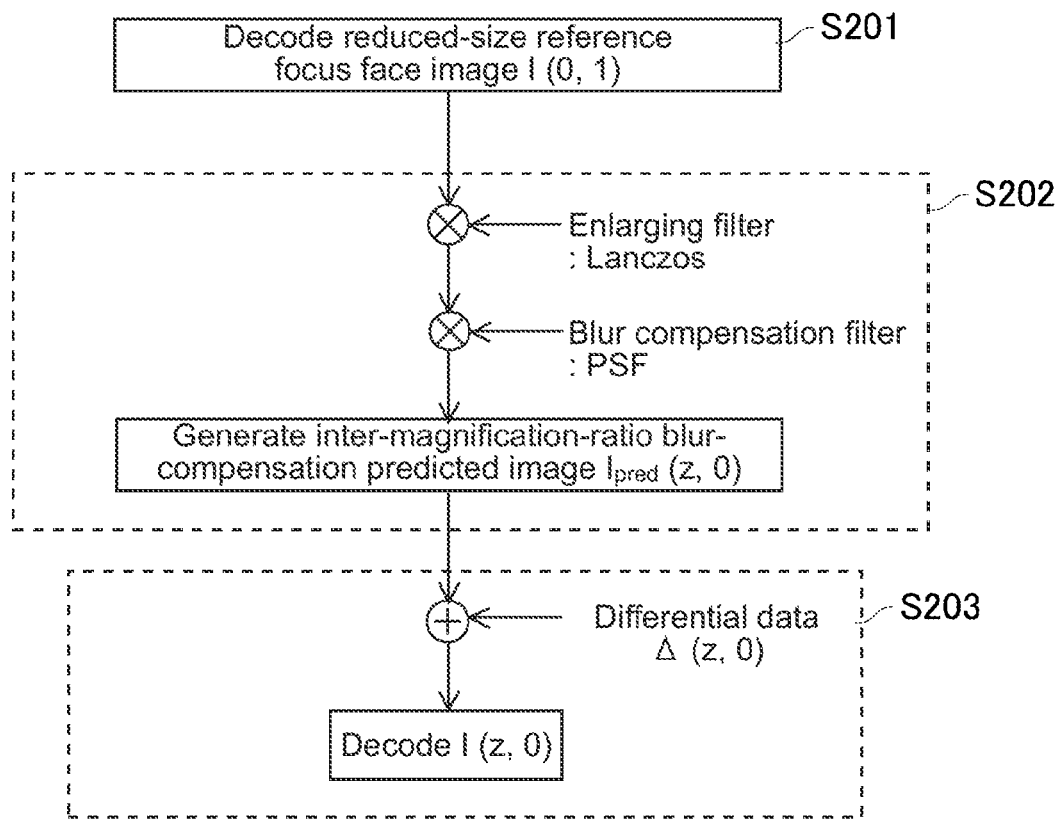
FIG. 5 is a flow chart showing a decoding procedure according to the first embodiment of the present invention.

FIG. 5 is a flow chart showing a decoding procedure.

In order to decode a focus face image at an arbitrary Z-position, first, the CPU 101 restores the reduced-size reference focus face image I(0, 1) being the reference image (Step S201).

Next, the CPU 101 applies, with respect to the reduced-size reference focus face image I(0, 1), the well-known magnification filter such as Lanczos expressed by Expression 1 and the blur compensation filter expressed by Expression 3, to thereby generate the inter-magnification-ratio blur-compensation predicted image $I_{pred}(z, 0)$ (Step S202). Then, the CPU 101 adds, to the inter-magnification-ratio blur-compensation predicted image $I_{pred}(z, 0)$, the differential data $\Delta(z, 0)$, to thereby restore the above-mentioned arbitrary focus face image I(z, 0) (Step S203).

As described above, according to the first embodiment, the encoded data is only one focus face image being at a lower magnification ratio as the reference image and the differential data regarding the focus face image at each Z-position, which is being at a higher magnification ratio than that of the above-mentioned focus face image. Thus, as compared with a generally employed compression process of compressing the focus face image at each Z-position, the compression rate is increased.

Further, according to the first embodiment, it is sufficient to perform only one decoding of the reference image necessary for the restoration of the focus face image at each Z-position and one inter-magnification-ratio blur-compensation prediction. Therefore, a process amount during the decoding is decreased. Thus, the process can be performed at a higher speed and a consumed amount of the memory can be decreased.

In addition, the image being at a lower magnification ratio is used as the reference image, and hence the consumed amount of the memory and the entire process amount can be further decreased.

<Second Embodiment>

Next, the description will be made of a second embodiment of the present invention.

In the first embodiment, when the inter-magnification-ratio blur-compensation prediction is performed, the application of the magnification filter such as Lanczos expressed by Expression 1 and the application of the blur compensation filter expressed by Expression 3 are each performed on the reduced-size reference focus face image I(0, 1). However, the present invention is not limited thereto, as in Expressions 6 and 7, a filter (MPSF) may be prepared in advance through combining the magnification filter with the blur compensation filter so that the filter may be applied to the reduced-size reference focus face image I(0, 1). According to the above-mentioned process, it is possible to reduce the process amount of calculation when the inter-magnification-ratio blur-compensation prediction is performed.

$$I_{pred}(Z,0) = I(0,1) \otimes mPSF(x,y,z/Mag) \quad \text{[Expression 6]}$$

$$mPSF(x,y,z/2) = Lanczos(x,y) \oplus PSF(x,y,z/Mag) \quad \text{[Expression 7]}$$

In this case, the allowed circle of confusion radius of the image having the size reduced into 1/Mag is Mag-fold. In view of this, the allowed circle of confusion radius used for the point spread function (PSF) is necessary for being 1/Mag-fold in advance.

By performing the inter-magnification-ratio blur-compensation prediction in the above-mentioned manner, it is possible to achieve a reduction of an amount of calculation necessary for the prediction process.

<Third Embodiment>

Next, the description will be made of a third embodiment of the present invention.

In an image to be observed in a case of using a bright field microscope or the like, an object to be examined is generally viewed as being transparent. Therefore, the following cases may occur. Specifically, a plurality of objects to be examined may be overlaid on each other. In some structures of the object to be examined, a focused position may not necessarily be located on a focus face. Otherwise, a plurality of objects to be examined may be dispersed with a result that a focused focus face for each of the objects to be examined may be varied.

In this regard, in the third embodiment, the CPU 101 performs the inter-magnification-ratio blur-compensation prediction performed based on the plurality of reduced-size reference focus face images so as to predict the focus face image I(z, 0) at the arbitrary Z-position, which is being at a high magnification ratio. With this, it is possible to increase the accuracy of the inter-magnification-ratio blur-compensation prediction, and hence it is possible to enhance the compression efficiency.

Figure 6:
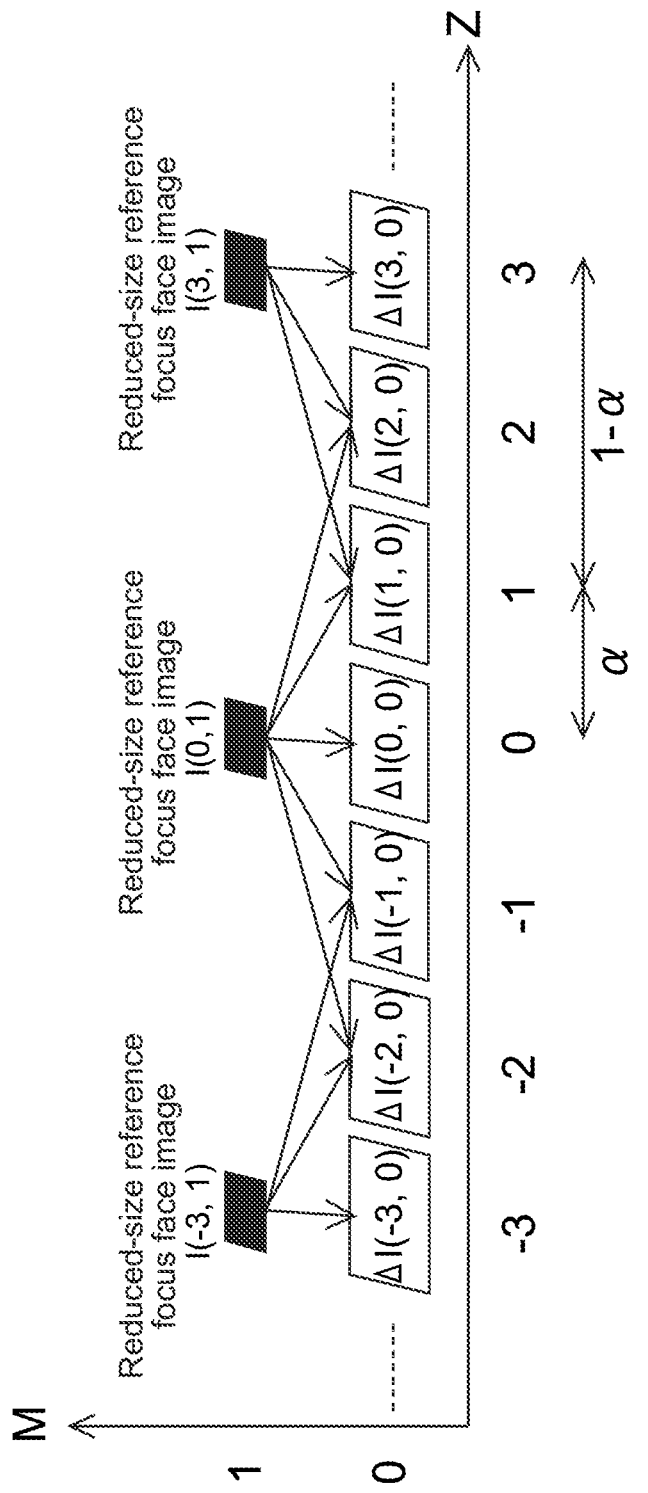
FIG. 6 is an explanatory diagram for an encoding process according to a third embodiment of the present invention.

Next, the description will be made of the details of the inter-magnification-ratio blur-compensation prediction performed based on the plurality of reduced-size reference focus face images. FIG. 6 is an explanatory diagram for the outline of an encoding process according to the third embodiment of the present invention.

First, the CPU 101 selects a plurality of more-focused focus face images being at a higher magnification ratio as the reference focus face image. In an example of FIG. 6, three focus face images, where Z=−3, 0, 3, are selected as the reference focus face images I(−3, 0), I(0, 0), and I(3, 0).

Next, the CPU 101 reduces the size of each of the plurality of reference focus face images (−3, 0), I(0, 0), and I(3, 0) through the well-known filter, for example, Lanczos, to thereby generate the reduced-size reference focus face images I(−3, 1), I(0, 1), and I (3, 1).

Next, the CPU 101 performs the inter-magnification-ratio blur-compensation prediction performed based on the plurality of reduced-size reference focus face images I(−3, 1), I(0, 1), I(3, 1), to thereby generate the inter-magnification-ratio blur-compensation predicted image $I_{pred}(z, 0)$. Specifically, the inter-magnification-ratio blur-compensation prediction performed based on the plurality of reduced-size reference focus face images I (−3, 1), I(0, 1), and I(3, 1) is performed as follows.

Now, a case of predicting the focus face image of I(1, 0) will be discussed. In this case, the CPU 101 applies the magnification filter and the blur compensation filter to two reduced-size reference focus face images I(0, 1) and I(3, 1) located in vicinity of the focus face image I(1, 0) being an object to be predicted. Otherwise, the filter (MPSF), which has been described in the second embodiment, is applied. In this time, a predicted value from each of the reduced-size reference focus face images is combined depending on a distance ratio as in Expression 8. In this manner, a final inter-magnification-ratio blur-compensation predicted image $I_{pred}(1, 0)$ of the focus face image I(1, 0) is generated.

$$I_{pred}(1,0) = (1-\alpha)[\{I(0,1) \otimes Lanczos(x,y)\} \otimes PSF(x,y, z=|1-0|)] + \alpha[\{I(3,1) \otimes Lanczos(x,y)\} \otimes PSF(x,y, z=|1-3|)] \quad \text{[Expression 8]}$$

As described above, according to the third embodiment, due to the prediction performed based on the plurality of reduced-size reference focus face images, it is possible to perform the prediction with a high accuracy even in a case where a plurality of focused focus faces are found.

<Fourth Embodiment>

Next, the description will be made of a fourth embodiment of the present invention.

As in the real microscope, in order to realize a smooth change operation of the magnification ratio (resolution) of the displayed image, in general, pieces of image data being at various magnification ratios are stored in advance as shown in FIG. 2, and in the pieces of the image data being at various magnification ratios, a pieces of image data being at a magnification ratio specified by the user is read. However, in this case, as the variety of magnifications increases, the image data amount is increased as a whole. Thus, a large volume storage portion becomes necessary to store the above-mentioned increased image data.

Figure 7:
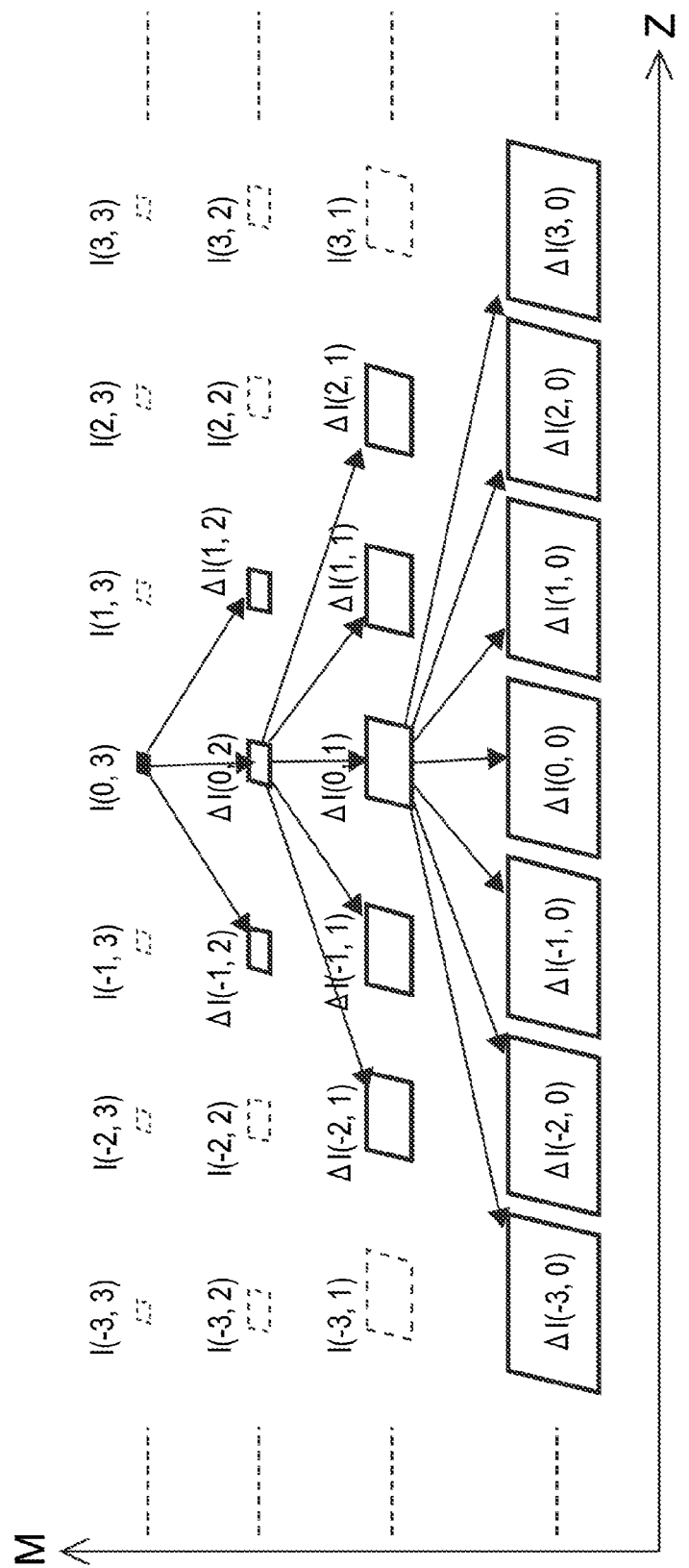
FIG. 7 is an explanatory diagram for a fourth embodiment of the present invention.

By applying the above-mentioned embodiments, as shown in FIG. 7, it becomes sufficient to store one image being at the minimum magnification ratio, and the differential data regarding the focus face images being at various magnification ratios larger than that of the image being at the minimum magnification ratio.

Next, as the fourth embodiment of the present invention, the description will be made of the operation of creating the above-mentioned image being at the minimum magnification ratio, and the differential data regarding the focus face images being at various magnification ratios larger than that of the image being at the minimum magnification ratio.

In FIG. 7, the horizontal axis is a Z-axis, and the vertical axis is an M-axis. I(z, m) represents an image defined by z in a Z-axis direction and by m in an M-axis direction. The image being at the minimum magnification ratio is one that is obtained in such a manner that the CPU 101 selects a best-focused reference focus face image among the focus face images being at the maximum magnification ratio and reduces the size of the selected best-focused reference focus face image into the minimum magnification ratio (for example, 1/8).

The CPU 101 predicts, from the reduced-size reference focus face image being at the minimum magnification ratio I(0, 3), an inter-magnification-ratio blur-compensation predicted image at an arbitrary Z-position, which is being at the second-lowest magnification ratio (for example, 1/4) by the inter-magnification-ratio blur-compensation prediction. The CPU 101 determines a difference between each inter-magnification-ratio blur-compensation predicted image and a focus face image I(−1, 2), I(0, 2), or I(1, 2) to be compressed, to thereby generate differential data Δ(−1, 2), Δ(0, 2), or Δ(1, 2).

Subsequently, the CPU 101 restores the focus face image I(0, 2) from the inter-magnification-ratio blur-compensation predicted image for the image being at the minimum magnification ratio I(0, 3) and from the differential data Δ(0, 2). The CPU 101 predicts, from the restored focus face image I(0, 2), an inter-magnification-ratio blur-compensation predicted image at an arbitrary Z-position, which is being at the second-lowest magnification ratio (for example, 1/2), by the inter-magnification-ratio blur-compensation prediction. The CPU 101 determines a difference between each inter-magnification-ratio blur-compensation predicted image and each focus face image I(−2, 1), I(−1, 1), I(0, 1), I(1, 1), or I(2, 1) to be compressed, to thereby generate the differential data Δ(−2, 1), Δ(−1, 1), Δ(0, 1), Δ(1, 1), or Δ(2, 1).

Subsequently, the CPU 101 restores the focus face image I(0, 1) from the inter-magnification-ratio blur-compensation predicted image for the focus face image I (0, 2) and from the differential data Δ(0, 1). The CPU 101 predicts, from the restored focus face image I (0, 1), an inter-magnification-ratio blur-compensation predicted image at an arbitrary Z-position, which is being at the second-lowest magnification ratio (maximum magnification ratio), by the inter-magnification-ratio blur-compensation prediction. The CPU 101 determines a difference between each inter-magnification-ratio blur-compensation predicted image, and each focus face image I(−3, 0), I(−2, 0), I(−1, 0), I(0, 0), I(1, 0), I (2, 0), or I(3, 0) to be compressed, to generate the differential data Δ(−3, 0), Δ(−2, 0), Δ(1, 0), Δ(0, 0), Δ(1, 0), Δ(2, 0), or Δ(3, 0).

As described above, from one image being at the minimum magnification ratio, the differential data of each of the focus face images being at various magnification ratios is obtained and stored in the storage portion. With this, as the case where each of pieces of the image data being at various magnification ratios is compressed in a generally employed compression process such as JPEG so as to be stored, the image data amount to be stored can be significantly reduced.

Further, by reducing the size of the image, the depth of focus becomes deeper, and a focused range (depth of field) is increased. For example, in a case where the size of the image is reduced into 1/Mag, the depth of focus is Mag-fold. Therefore, the focus face images adjacent to each other in a layer of a low magnification ratio is substantially the same, and hence it is unnecessary to create and store the differential data regarding focus face images at all magnification ratios in all Z-positions.

In view of this, FIG. 7 shows a case where the storing of a part of the focus face image is omitted. Squares indicated by dotted lines represents focus face images, the differential data of which is not stored. Among the above-mentioned squares, in order to display the images I(−3, 3), I(−2, 3), I(−1, 3), I(1, 3), I (2, 3), and I(3, 3), the image I(0, 3) is used in place of the above-mentioned images. Similarly, in order to display the images of I(−3, 2) and I(−2, 2), the image of I(−1, 2) is used in place of the above-mentioned images. In order to display the images of I (2, 2) and I(3, 2), the image of I(1, 2) is used in place of the above-mentioned images. In order to display the image of I(−3, 1), the image of I(−2, 1) is used in place of the above-mentioned image. In order to display the image of I(3, 1), the image of I (2, 1) is used in place of the above-mentioned image. With this configuration, the entire image data amount to be stored can be further reduced.

<Fifth Embodiment>

Next, the description will be made of a fifth embodiment of the present invention.

The fifth embodiment relates to the following technology. Specifically, in the technology, in addition to the correlation between the focus face images in the Z-axis direction and the correlation between the focus face images being at various magnification ratios, a correlation between stereo images (interocular images) is utilized to efficiently compress stereo image data imaged through a stereo camera, a multi array camera, or the like. The above-mentioned technology is effectively used, for example, in a case where a focus-face-image stereo pair, which are imaged through a single lens camera mounted on the microscope while performing a displacement of an X-Y coordinate, is compressed, and in a case where a focus-face-image stereo pair imaged through a double lens camera is compressed.

In the following, the description will be made of an operation of compressing the stereo image data in the fifth embodiment.

Figure 8:
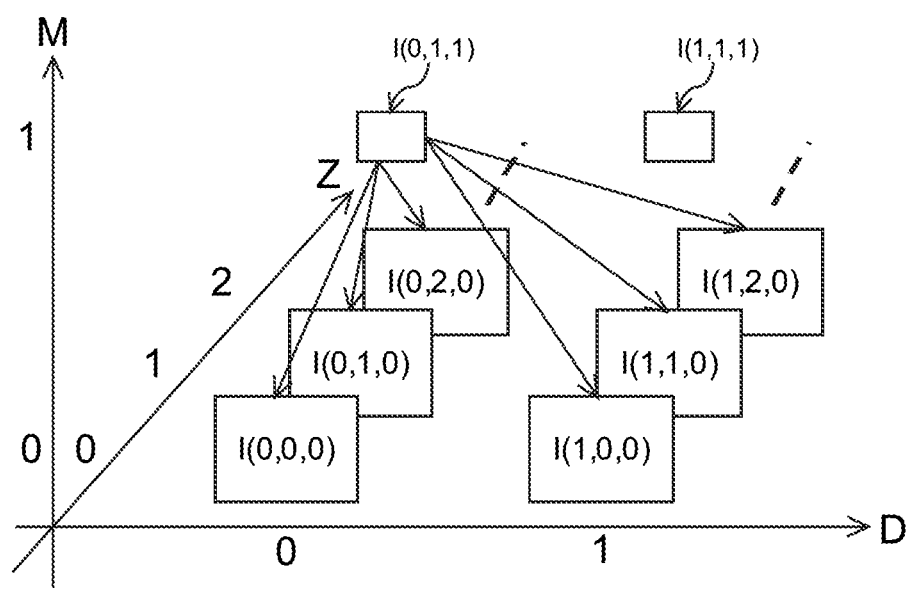
FIG. 8 is an explanatory diagram for a fifth embodiment of the present invention.

FIG. 8 is an explanatory diagram for an operation according to the fifth embodiment of the present invention. In FIG. 8, the horizontal axis is a D-axis in an interocular direction, the depth direction is a Z-axis, and the vertical axis is an M-axis. An image I (d, z, m) at an arbitrary position in coordinates represent an image defined by d in the interocular direction, by z in the Z-axis direction, and by m in the M-axis direction M. It should be noted that in a case of the stereo image data, a value of d is 0 or 1. Thus, an image for the left eye is represented by I(0, z, m), and an image for the right eye is represented by I(1, z, m).

First, the CPU 101 selects one of right and left reference focus face images, which is more-focused. Here, it is assumed that an image I(0, 1, 0) for the left eye (d=0), where z=1, is selected as the reference focus face image.

Next, the CPU 101 reduces the size of the reference focus face image for the left eye I(0, 1, 1) through the well-known filter, for example, Lanczos, to thereby generate the reduced-size reference focus face image I(0, 1, 1).

Next, the CPU 101 performs the inter-magnification-ratio blur-compensation prediction performed based on the reduced-size reference focus face image I(0, 1, 1) for the left eye, to thereby generate an inter-magnification-ratio blur-compensation predicted image for the left eye $I_{pred}(0, z, 0)$ at an arbitrary Z-position.

Next, the description will be made of a prediction method for the focus face image for the right eye.

In order to perform an interocular prediction, an operation of shifting a spatial position of the reference image is performed (see, Document: ITU-T H.264 Annex H Multiview video coding or the like).

In Expression 9, there is expressed an operation 3 of shifting an image T in a spatial x-y direction by (a, b), to thereby obtain an image T'.

$$T' = \mathrm{Shift}(T, a, b) \qquad \text{[Expression 9]}$$

The CPU 101 generates, through the above-mentioned operation, based on the reduced-size reference focus face image for the left eye I(0, 1, 1), an inter-magnification-ratio blur-compensation predicted image $I_{pred}(1, z, 0)$ of an arbitrary focus face image for the right eye I(1, z, 0). The prediction operation is expressed in Expression 10.

$$I_{pred}(1,z,0)=[\text{Shift}(I(0,1,1),a,b) \otimes \text{Lanczos}(x,y)] \otimes \text{PSF}(x,y,z) \quad \text{[Expression 10]}$$

It should be noted that, though a reduced-size reference focus face image for the right eye of I(1, 1, 1) may be obtained by the prediction performed based on the reduced-size reference focus face image for the left eye I(0, 1, 1) according to the technology described in the above-mentioned Document, the reduced-size reference focus face image for the right eye of I (1, 1, 1) may be predicted based on another focus face image for the left eye such as I(0, 2, 1) or I(0, 3, 1) being at the same magnification ratio as that of the reduced-size reference focus face image I for the left eye (0, 1, 1).

Next, the CPU 101 determines a difference between right and left focus face images (d, z, 0) and the inter-magnification-ratio blur-compensation predicted image $I_{pred}(0, z, 0)$, to thereby generate differential data Δ(d, z, 0).

The CPU 101 stores the reduced-size reference focus face image for the left eye I(0, 1, 1) and the differential data Δ(d, z, 0) as a result of the compression encoding of the image in the storage portion 108 (FIG. 9). Further, the CPU 101 outputs the reduced-size reference focus face image for the left eye I(0, 1, 1) and the differential data Δ(d, z, 0), for example, through communicating to the outside through the communication portion 109 (FIG. 9).

Next, the description will be made of the decoding method of the image data to be decoded by the decoding apparatus of the fifth embodiment.

First, the CPU 101 decodes the reduced-size reference focus face image I(0, 1, 1) being the reference image.

Next, the CPU 101 applies, with respect to the reduced-size reference focus face image for the left eye I(0, 1, 1), the well-known magnification filter such as Lanczos expressed by Expression 1 and the blur compensation filter expressed by Expression 3, to thereby generate the inter-magnification-ratio blur-compensation predicted image $I_{pred}(0, z, 0)$. Then, the CPU 101 restores the differential data Δ(0, z, 0) to the inter-magnification-ratio blur-compensation predicted image $I_{pred}(0, z, 0)$, to thereby restore the focus face image I for the left eye (0, z, 0) at an arbitrary Z-position.

Subsequently, the CPU 101 generates, from the inter-magnification-ratio blur-compensation predicted image for the left eye $I_{pred}(0, z, 0)$, the inter-magnification-ratio blur-compensation predicted image for the right eye $I_{pred}(1, z, 0)$, using Expression 10. Then, the CPU 101 adds the differential data Δ(1, z, 0) to the inter-magnification-ratio blur-compensation predicted image for the right eye $I_{pred}(1, z, 0)$, to thereby restore the focus face image for the right eye I(1, z, 0) at the arbitrary Z-position.

As described above, according to the fifth embodiment, the encoded data is only the focus face image of any one of the right and left focus face images, which is being at a low magnification ratio and serves as the reference image, and the differential data regarding the right and left focus face images at respective Z-positions each being at a higher magnification ratio than that of the above-mentioned focus face image. Thus, as compared with a generally employed compression process of performing a compression for each of the right and left focus face images at respective Z-positions, the compression rate is increased.

Further, according to the fifth embodiment, it is sufficient to perform only one decoding of the reference image necessary for the restoration of the right and left focus face images at respective Z-positions and one inter-magnification-ratio blur-compensation prediction. Therefore, a process amount during the decoding is decreased. Thus, the process can be performed at a higher speed and a consumed amount of the memory can be decreased.

In addition, the image being at a lower magnification ratio is used as the reference image, and hence the consumed amount of the memory and the entire process amount can be further decreased.

It should be noted that in a case of an image imaged by a multi array camera, the range of d is not constrained, and a compression thereof can be performed by the equivalent process.

[Hardware Configuration of Image Processing Apparatus]

FIG. 9 is a block diagram showing a hardware configuration of an image processing apparatus according to the above-mentioned embodiments of the present invention. As the image processing apparatus, for example, the PC (Personal Computer) 100 is used.

The PC 100 includes the CPU (Central Processing Unit) 101, the ROM 102 (Read Only Memory), an RAM (Random Access Memory) 103, an input/output interface 105, and a bus 104 to connect those components to each other.

To the input/output interface 105, a display portion 106, an input portion 107, a storage portion 108, a communication portion 109, a drive portion 110, and the like are connected.

The display portion 106 is, for example, a display device using liquid crystal, EL (Electro-Luminescence), or a CRT (Cathode RayTube).

The input portion 107 includes a pointing device, a keyboard, a touch panel, and the other operation apparatuses. In a case where the input portion 107 includes a touch panel, the touch panel may be integrated with the display portion 106.

The storage portion 108 is a nonvolatile memory, for example, an HDD (Hard Disk Drive), a flash memory, or another solid memory.

The drive portion 110 is, for example, a device capable of driving a removable recording medium 111 such as an optical recording medium, a floppy (registered mark) disk, a magnetic recording tape, or a flash memory. Meanwhile, the above-mentioned storage portion 108 is often used as a device installed in advance in the PC 100, which mainly drives a non-removable recording medium.

The communication portion 109 is a modem, a router, or another communication equipment, which can be connected to an LAN (Local Area Network), a WAN (Wide Area Network), and the like. The communication portion 109 may perform a wired communication or a wireless communication. The communication portion 109 is often used separately from the PC 100.

It should be noted that the present invention is not limited to the above-mentioned embodiments, and various modifications can be made without departing from the gist of the invention.

The present application contains subject matter related to that disclosed in Japanese Priority Patent Application JP 2009-281059 filed in the Japan Patent Office on Dec. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
at least one processor configured to:
perform an inter-magnification-ratio blur-compensation prediction with respect to a reduced-size reference focus face image, to thereby generate an inter-magnification-ratio blur-compensation predicted image at each of a plurality of focus positions, the reduced-size reference focus face image being obtained by reducing a size of a reference focus face image to be a reference of a plurality of focus face images obtained by imaging a subject at the plurality of focus positions, wherein the inter-magnification-ratio blur-compensation prediction is performed using a magnification filter followed by a blur compensation filter, wherein the magnification filter is a Lanczos filter, and wherein the blur compensation filter used for each of the plurality of focus positions is a point spread function of the respective focus position;

generate, for each of the plurality of focus positions, differential data between the focus face image associated with a respective focus position and the inter-magnification-ratio blur-compensation predicted image associated with the same respective focus position; and encode the reduced-size reference focus face image and the generated differential data.

2. The image processing apparatus according to claim 1, wherein the inter-magnification-ratio blur-compensation prediction is based on a plurality of reference focus face images.

3. The image processing apparatus according to claim 1, wherein the processor is further configured to reduce the size of the reference focus face image, to thereby generate the reduced-size reference focus face image.

4. The image processing apparatus according to claim 1, wherein the focus face image is an image obtained by stereo-imaging a subject at the plurality of focus positions.

5. An image processing method, comprising:
performing an inter-magnification-ratio blur-compensation prediction with respect to a reduced-size reference focus face image, to thereby generate an inter-magnification-ratio blur-compensation predicted image at each of a plurality of focus positions, the reduced-size reference focus face image being obtained by reducing a size of a reference focus face image to be a reference of a plurality of focus face images obtained by imaging a subject at the plurality of focus positions, wherein the inter-magnification-ratio blur-compensation prediction is performed using a magnification filter followed by a blur compensation filter, wherein the magnification filter is a Lanczos filter, and wherein the blur compensation filter used for each of the plurality of focus positions is a point spread function of the respective focus position;

generating, for each of the plurality of focus positions, differential data between the focus face image associated with a respective focus position and the generated inter-magnification-ratio blur-compensation predicted image associated with the same respective focus position; and encoding the reduced-size reference focus face image and the generated differential data.

6. The image processing method of claim 5, wherein the inter-magnification-ratio blur-compensation prediction is based on a plurality of reference focus face images.

7. The image processing method of claim 5, further comprising reducing the size of the reference focus face image, to thereby generate the reduced-size reference focus face image.

8. The image processing method of claim 5, wherein the focus face image is an image obtained by stereo-imaging a subject at the plurality of focus positions.

9. An image processing apparatus, comprising:
at least one processor configured to:
decode encoded data obtained by encoding a reduced-size reference focus face image and differential data, the reduced-size reference focus face image being obtained by reducing a size of a reference focus face image to be a reference of a plurality of focus face images obtained by imaging a subject at a plurality of focus positions, the differential data being obtained by determining a difference, for each of the plurality of focus positions, between the focus face image associated with a respective focus position and an inter-magnification-ratio blur-compensation predicted image associated with the same respective focus position, the inter-magnification-ratio blur-compensation predicted image obtained by performing an inter-magnification-ratio blur-compensation prediction with respect to the reduced-size reference focus face image;

perform an inter-magnification-ratio blur-compensation prediction with respect to the reduced-size reference focus face image, to thereby generate an inter-magnification-ratio blur-compensation predicted image at each of the plurality of focus positions, wherein the inter-magnification-ratio blur-compensation prediction is performed using a magnification filter followed by a blur compensation filter, wherein the magnification filter is a Lanczos filter, and wherein the blur compensation filter used for each of the plurality of focus positions is a point spread function of the respective focus position; and combine the inter-magnification-ratio blur-compensation predicted image with the differential data, to thereby restore the focus face image at each of the plurality of focus positions.

10. The image processing apparatus of claim 9, wherein the inter-magnification-ratio blur-compensation prediction is based on a plurality of reference focus face images.

11. The image processing apparatus of claim 9, wherein the processor is further configured to reduce the size of the reference focus face image, to thereby generate the reduced-size reference focus face image.

12. The image processing apparatus of claim 9, wherein the focus face image is an image obtained by stereo-imaging a subject at the plurality of focus positions.

13. An image processing method, comprising:
decoding encoded data obtained by encoding a reduced-size reference focus face image and differential data, the reduced-size reference focus face image being obtained by reducing a size of a reference focus face image to be a reference of a plurality of focus face images obtained by imaging a subject at a plurality of focus positions, the differential data being obtained by determining a difference, for each of the plurality of focus positions, between the focus face image associated with a respective focus position and an inter-magnification-ratio blur-compensation predicted image associated with the same respective focus position, the inter-magnification-ratio blur-compensation predicted image obtained by performing an inter-magnification-ratio blur-compensation prediction with respect to the reduced-size reference focus face image;

performing an inter-magnification-ratio blur-compensation prediction with respect to the decoded reduced-size reference focus face image, to thereby generate an inter-magnification-ratio blur-compensation predicted image at each of the plurality of focus positions, wherein the inter-magnification-ratio blur-compensation prediction is performed using a magnification filter followed by a blur compensation filter, wherein the magnification filter is a Lanczos filter, and wherein the blur compensation filter used for each of the plurality of focus positions is a point spread function of the respective focus position; and combining the generated inter-magnification-ratio blur-compensation predicted image with the decoded differential data, to thereby restore the focus face image at each of the plurality of focus positions.

14. The image processing method of claim 13, wherein the inter-magnification-ratio blur-compensation prediction is based on a plurality of reference focus face images.

15. The image processing method of claim 13, further comprising reducing the size of the reference focus face image, to thereby generate the reduced-size reference focus face image.

16. The image processing method of claim 13, wherein the focus face image is an image obtained by stereo-imaging a subject at the plurality of focus positions.

\* \* \* \* \*